Patented June 10, 1924.

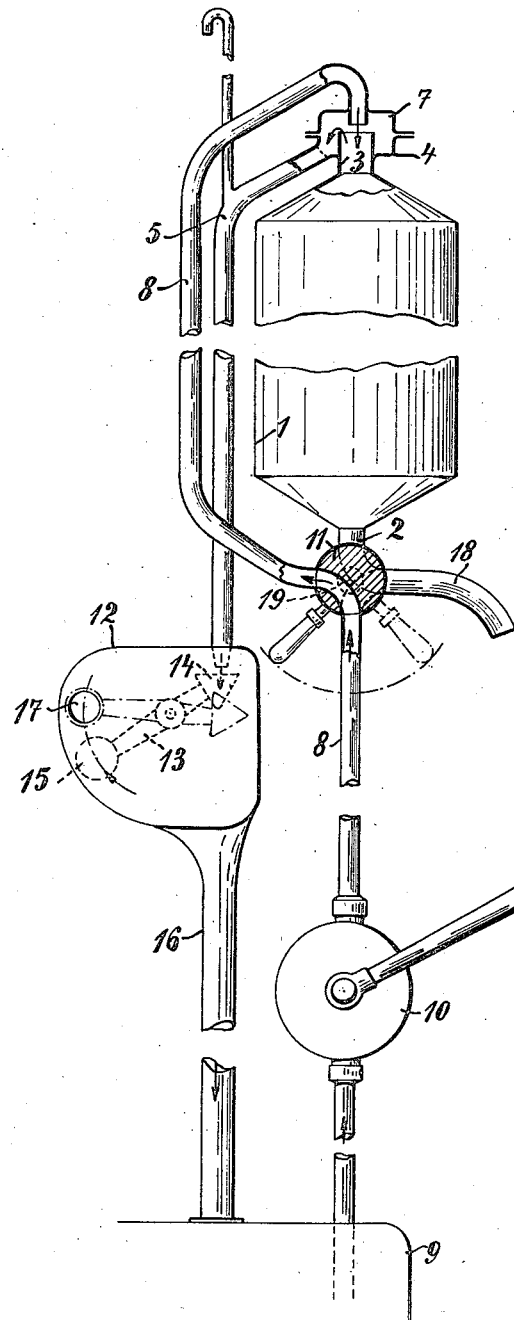

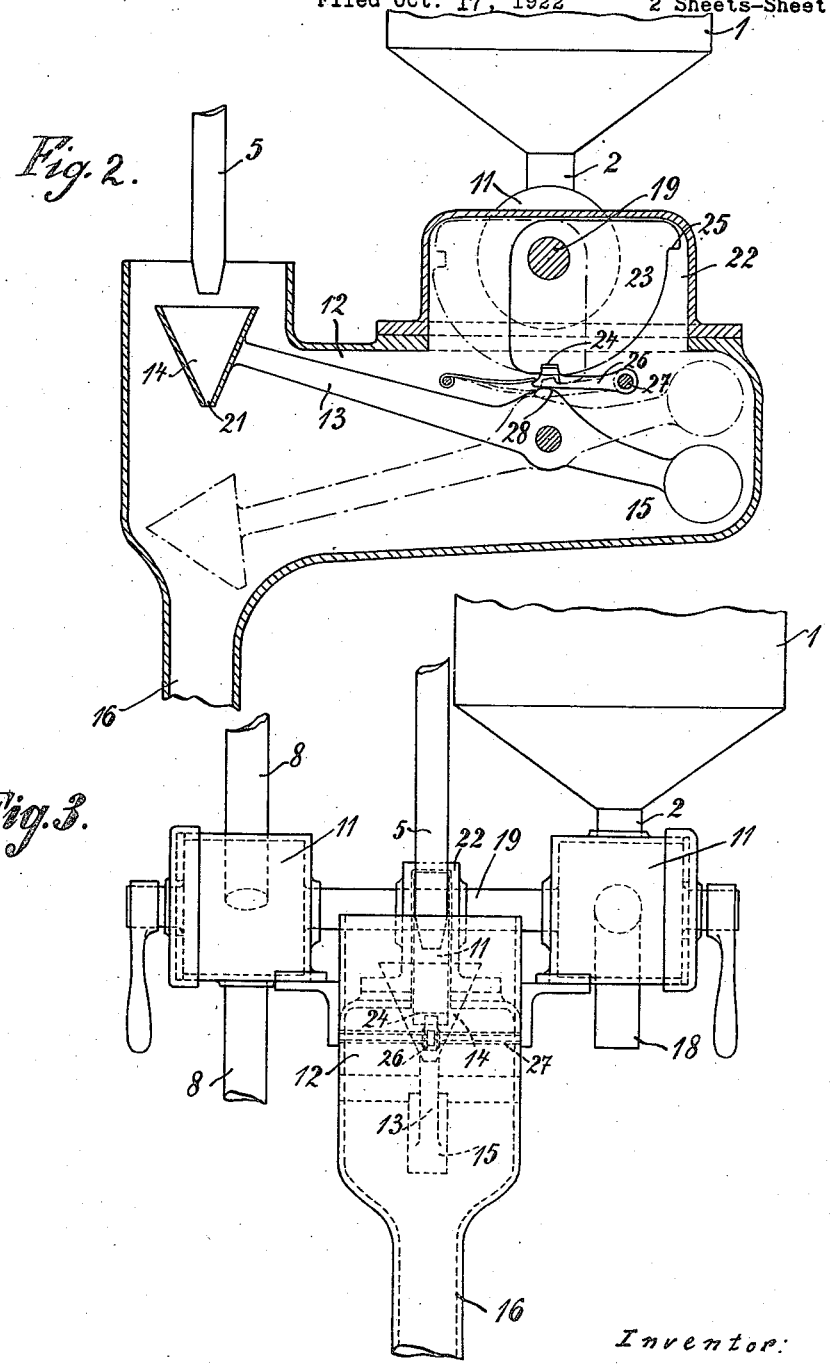

1,497,234

UNITED STATES PATENT OFFICE

WILLIAM BERNHARD WILSON, OF STOCKHOLM, SWEDEN.

APPARATUS FOR MEASURING AND DRAWING OFF LIQUIDS.

Application filed October 17, 1922. Serial No. 595,166.

*To all whom it may concern:*

Be it known that I, WILLIAM BERNHARD WILSON, subject of Sweden, residing at Stockholm, Sweden, have invented certain new and useful Improvements in an Apparatus for Measuring and Drawing Off Liquids, of which the following is a specification.

The present invention refers to an apparatus for measuring and drawing off liquid, especially such liquids which are dangerous on account of being more or less highly inflammable.

Contrary to the apparatus known heretofore in which the liquid is introduced into the measuring tank by valves which for divers reasons will not allow a correct measuring or dosing, owing to leakages, and which get easily out of order, and also contrary to such apparatus in which the volume of the measuring tank can be adjusted by a movable partition wall or a piston or the like, and which therefore can easily be tampered with or altered without difficulty in dishonest intentions.

According to the present invention the measuring or drawing off apparatus is so constructed that the liquid to be measured runs into the measuring tank in a free stream or jet, the measuring tank being provided with an overflow which determines the amount of the liquid to be measured. In connection with this apparatus a device is used, which is operated by the stream of liquid passing the overflow for indicating, when the prescribed amount of liquid is filled into the tank. The new apparatus forms a closed unit, which does not allow any tampering from outside.

In Fig. 1 of the drawing the apparatus is shown in an elevation partly in section.

Fig. 2 is a detail of a modification in section and

Fig. 3 in elevation.

The apparatus consists principally of a measuring tank 1, which by way of example is shown in the drawing as having the shape of a cylinder, having at its lower end an outlet pipe 2, and at its upper end an open neck 3. The latter is surrounded by a collar 4 dished to form a cup, from which the pipe 5 branches off and which is closed on top by a cover 7. The neck 3 forms an overflow for the measuring tank 1, which is so gauged, that the prescribed volume is obtained, when the liquid begins to run over the neck 3. The inlet pipe 8 for the measuring tank is passed through the cover 7 of the cup 4 in such a position, that the mouth of the pipe is situated approximately centrally over the neck 3 for a short distance, so that the liquid running out through the inlet pipe, enters the tank by the neck in a free stream or jet. The liquid is drawn out of the reservoir 9 and fed into the tank by any suitable means for instance by a pump 10 which may be operated for instance by a handle 20. It is not an absolute necessity that the overflow and the feed of the liquid are dependent from one another. The inlet pipe 8 and the outlet pipe 2, 18 are controlled each by a valve 11. The two valves are lying one behind the other and may be connected by a common pivot 19. The two valves 11 are so attached to the pivot 19, that, when, as is shown in the drawing, the inlet pipe 8 is open, the outlet pipe 2, 18 is closed and vice versa. Therefore no liquid can be led into the tank as long as the outlet 2, 18 is not closed.

Means are provided for indicating, when the measuring tank is filled. These means consist of a casing arranged within the overflow pipe 5 and its prolongation 16. Within the casing 12 a lever 13 is loosely journaled, having at one end a small goblet 14, and on the other end a counter weight 15, in its normal position is held below the mouth of the pipe 5, reaching into the casing 12. The surplus amount of liquid, which has passed the overflow 3, thus will run into the goblet, which when filled overbalances the counter weight 15, and the lever 13 will oscillate. The last described device can be connected with a signal of any known description, for instance as shown an optical signal, consisting of an opening 17 in the wall of the casing 12, opposite to the weight 15, in the position of the lever 13, which it attains when the filled goblet overcomes the weight 15. Thus, when the weight 15 appears behind the opening 17, it will be understood, that the measuring tank 1 is filled, at which moment the pump is to cease operating, and the valves 11 may be turned to close the inlet pipe and to open the outlet pipe 2, 18 to allow the measured liquid to run out.

When the lever oscillates part of the liquid of the goblet 14 will run over its edge and back into the reservoir 9 by the pipe 16. The small opening 21, Fig. 2, in the goblet 14 will allow the rest of the liquid to run out, so that the lever 13 thereupon can return to its normal position.

It may be remarked that the accurate gauging of the measuring tank can be done by grinding the top edge of the neck 3.

It may be remarked that the valves 11 may be situated independently from one another, in which case the pivot 19 connecting the two valves may be omitted.

In the construction shown in Figs. 2 and 3 it is taken for granted that the valve bodies are fixed to the pivot 19 which passes through a dome 22 attached to the top of the casing 12. Within this dome 22 a locking member 23 preferably in the shape of a segment, having at one end a notch 24 and at the other end a tooth or stop 25, is keyed to the pivot 19. A spring-pressed pawl 26 is adapted to catch into the groove 24, thus locking the segment 23 and by the aid of the pivot 19 also the two valves 11. This pawl is pivoted on a rod 27 opposite the lever 13, provided with a cam 18 which is adapted to engage the pawl 26 in locking position with the segment 23, when the goblet 14 is in the position shown in full lines in Fig. 2. This position of the parts will take place during the filling of the measuring tank 1, that is to say when the inlet valve 11 is open and the outlet valve 11 is closed. When the goblet 14 is filled and moves into the position shown in dotted lines in Fig. 2, the cam 28 is removed from the pawl 26, thus releasing the locking member 23, and now the operator can shut the inlet valve and open the outlet valve. Thus means are provided to prevent the measuring tank to be emptied before it is completely filled.

I claim:

1. An apparatus for measuring and drawing off liquids, particularly inflammable liquids, comprising a measuring tank, an inlet pipe, an outlet pipe, an overflow conduit, and means operated by the stream of liquid passing through the overflow conduit to indicate when the tank is filled.

2. An apparatus for measuring and drawing off liquids, particularly inflammable liquids, comprising a measuring tank, an inlet pipe, an outlet pipe, an overflow conduit, and means operated by the stream of liquid passing through the overflow conduit to indicate when the tank is filled, a neck on top of the tank. the inlet pipe discharging above the neck, so as to allow the liquid to run into the neck from above in a free stream or jet.

3. An apparatus for measuring and drawing off liquids, particularly inflammable liquids, comprising a measuring tank, an inlet pipe, an outlet pipe, an overflow conduit, and means operated by the stream of liquid passing through the overflow conduit to indicate when the tank is filled, a neck on top of the tank, forming an overflow, a collar surrounding the neck and forming a cup, and the said overflow pipe branching off from the said cup.

4. An apparatus for measuring and drawing off liquids, particularly inflammable liquids, comprising a measuring tank, an inlet pipe, an outlet pipe, an overflow conduit, and means operated by the stream of liquid passing through the overflow conduit to indicate when the tank is filled, a neck on the top of the tank, forming an overflow, a collar surrounding the neck and forming a cup, and the said over-flow pipe branching off from the said cup, the inlet pipe passing through the top of the cup above the neck, so as to allow the liquid to run into the neck from above in a free stream or jet.

5. An apparatus for measuring and drawing off liquids, comprising a reservoir, a measuring tank, a neck on top of the measuring tank, forming an overflow, a collar dished to form a cup, surrounding the neck, an overflow pipe branching off from the said cup and leading back to the reservoir, means within the overflow pipe operated by the liquid running through the said overflow pipe to indicate when the tank is filled.

6. An apparatus for measuring and drawing off liquids, comprising a reservoir, a measuring tank, a neck on top of the measuring tank, forming an overflow, a collar dished to form a cup, surrounding the neck, an overflow pipe branching off from the said cup and leading back to the reservoir, means within the overflow pipe operated by the liquid running through the said overflow pipe to indicate when the tank is filled, an inlet pipe passing through the top of the cup above the neck so as to allow the liquid to run into the neck from above in a free stream or jet.

7. An apparatus for measuring and drawing off liquids, particularly inflammable liquids, comprising a measuring tank, an inlet pipe, an outlet pipe, an overflow conduit, and means operated by the stream of liquid passing through the overflow conduit to indicate when the tank is filled, valves in the inlet pipe and in the outlet pipe, and means to lock the valves in position until the measuring tank is filled.

8. An apparatus for measuring and drawing off liquids, particularly inflammable liquids, comprising a measuring tank, an inlet pipe, an outlet pipe, an overflow conduit, and means operated by the stream of liquid passing through the overflow conduit to indicate when the tank is filled, valves in the inlet pipe and in the outlet pipe, and means to lock the valves in position until the measuring tank is filled, consisting of a locking member fixed to the valve bodies, and locked by the means to indicate when the tank is filled.

9. An apparatus for measuring and drawing off liquids, comprising a measuring tank, an inlet pipe, an outlet pipe, an overflow pipe, a casing open on one side below the overflow pipe, a lever in the casing and a goblet attached to the lever below the mouth of the overflow pipe, a counterweight on the lever adapted to hold the goblet in upper position, a signal in connection with the lever adapted to indicate when the goblet is moved downward by being filled from the upper flow, valves in the inlet pipe and in the outlet pipe to control the filling of the measuring tank.

10. An apparatus for measuring and drawing off liquids, comprising a measuring tank, an inlet pipe, an outlet pipe, an overflow pipe, a casing open on one side below the overflow pipe, a lever in the casing and a goblet attached to the lever below the mouth of the overflow pipe, a counterweight on the lever adapted to hold the goblet in upper position, a signal in connection with the lever adapted to indicate when the goblet is moved downward by being filled from the upper flow, valves in the inlet pipe and in the outlet pipe to control the filling of the measuring tank, a pivot connecting the two valves and means to lock the valves when the goblet is in the upper position.

11. An apparatus for measuring and drawing off liquids, comprising a measuring tank, an inlet pipe, an outlet pipe, an overflow pipe, a casing open on one side below the overflow pipe, a lever in the casing and a goblet attached to the lever below the mouth of the overflow pipe, a counterweight on the lever adapted to hold the goblet in upper position, a signal in connection with the lever adapted to indicate when the goblet is moved downward by being filled from the upper flow, valves in the inlet pipe and in the outlet pipe to control the filling of the measuring tank, a pivot connecting the two valves and means to lock the valves when the goblet is in the upper position, said means comprising a locking member attached to the said pivot, a pawl adapted to engage the said locking member and a cam on the said lever to hold the pawl in locking engagement with the locking member when the goblet is empty.

In testimony whereof I have signed my name to this specification.

WILLIAM BERNHARD WILSON.